United States Patent [19]

Hsu et al.

[11] Patent Number: 6,148,373
[45] Date of Patent: Nov. 14, 2000

[54] APPARATUS AND METHODS FOR INCREASING MEMORY UTILIZATION

[75] Inventors: Jerry Hsu, Tainan; Wesley Chen, Hsinchu; Chris Hung, Taichung, all of Taiwan

[73] Assignee: United Microelectronics Corp., Hsin-Chu, Taiwan

[21] Appl. No.: 09/034,262

[22] Filed: Mar. 4, 1998

[30] Foreign Application Priority Data

May 29, 1997 [TW] Taiwan .................................. 86107282

[51] Int. Cl.⁷ ...................................... G06F 12/08
[52] U.S. Cl. .......................... 711/125; 711/103; 711/123; 711/129; 711/173; 710/130
[58] Field of Search ..................... 711/103, 129, 711/123, 173, 125; 710/130

[56] References Cited

U.S. PATENT DOCUMENTS

| | | | |
|---|---|---|---|
| 5,454,107 | 9/1995 | Lehman et al. .......................... | 711/153 |
| 5,603,055 | 2/1997 | Evoy et al. .................................. | 713/2 |
| 5,737,750 | 4/1998 | Kumar et al. ............................ | 711/129 |
| 5,860,083 | 1/1999 | Sukegawa ................................ | 711/103 |
| 5,875,465 | 2/1999 | Kilpatrick et al. ....................... | 711/134 |

*Primary Examiner*—Hiep T. Nguyen
*Attorney, Agent, or Firm*—Finnegan, Henderson, Farabow, Garrett & Dunner, L.L.P.

[57] ABSTRACT

A method and device for increasing memory utilization using a central processing unit with a Harvard architecture, and by putting speech data into the program memory, that is, putting both the program and the data into the same program memory, memory which is normally wasted by internal instruction is now conserved. Furthermore, no changes are required in the hardware of the central processing unit except for some minor changes to the external circuits, so the original central processing unit can be immediately used for the fabrication of prototypes and programs can be developed faster benefiting market expansion.

18 Claims, 8 Drawing Sheets

```
Format        :RTNW H,L
Instruction:11010 000h hhh llll
Function      :PC<— ST, TBR <— hhhh, AC< —llll
Flag Affected:None
Execution Time: 1 instruction cycle
Functional Description:returning to main program,
            putting stack content into PC,putting
            value H into TBR and value L into AC.
[Example]: TBR   EQU  0EH
           TEMP  EQU  20H
                  :

001E    LDI   TBR,0H
   001F    LDI   TEMP,02
   0020    CALL  300H
   0021      :
              :
   0300    TJMP
   0301    RTNW  00H,00H
   0302    RTNW  00H,01H
   0303    RTNW  00H,02H
   0304      :
              :
```

Execution Explanations:
001E: index value(high nibble)0 put into TBR
001F: index value(low nibble)2 put into AC
0020: calling up subprogram
0300: the first instruction in the subprogram is a TJMP instruction,according to PC11~PC8(obtained from subprogram,that is,the MSB 03H of address $300),plus the value set in TBR(0)andAC(2)by the main program ,the jump-to address $0302 is obtained.
0302: returning to main program,with the H value of 0 entered into TBR and L value of 01 entered into AC in order to obtain the data.

FIG. 4 (PRIOR ART)

Format : TJMP
Instruction: 11110 1111 111 1111
Function : PC<−(PC11~PC8)(TRB)(A)
Flag Affected: None
Execution Time: 1 instruction cycle
Functional Description: jumping to the address formed by the grouping of PC11~PC8, TBR,A and execute the instruction there.
[Example]: Referring to the example in RTNW instruction.

```
if (ADDR[14] == 1'b0) begin    // Program Area
    DATA[15:0] = ROMBIT[15:0]
end
else begin    // Data Area
    if (HIGHBYTE == 1'b1)    // High Byte
        DATA[15:0] = {8'b11010000, ROMBIT[15:8]};
    else    // Low Byte
        DATA[15:0] = {8'b11010000, ROMBIT[7:0]};
end
```

FIG. 10

```
Case(OPTION[1:0]) begin
    0:
        if (ADDR[14] == 1)
            ISDATA = 1;
    1:
        if (ADDR[14] == 1) && ADDR[13] == 1)
            ISDATA = 1;
    2:
        ...
    3:
        ...
endcase
if (!ISDATA) begin    // Program Area
    DATA[15:0] = ROMBIT[15:0]
end
else begin    // Data Area
    if (HIGHBYTE == 1'b1)    // High Byte
        DATA[15:0] = {8'b11010000, ROMBIT[15:8]};
    else    // Low Byte
        DATA[15:0] = {8'b11010000, ROMBIT[7:0]};
end
```

APPARATUS AND METHODS FOR INCREASING MEMORY UTILIZATION

CROSS-REFERENCE TO RELATED APPLICATION

This application claims the priority benefit of Taiwan application serial no.86107282, filed May 29, 1997, the fill disclosure of which is incorporated herein by reference.

BACKGROUND OF THE INVENTION

1. Field of Invention

This invention relates to an apparatus and methods for increasing memory ultililzation, and more particularly to an apparatus and methods for increasing memory ultilization using a program ROM in a reduced instruction set computer (RISC) type of microprocessor to obtain an optimal memory utilization, without the necessity of changing the microprocessor architecture or modifying the instruction set.

2. Description of Related Art

Figure 1:
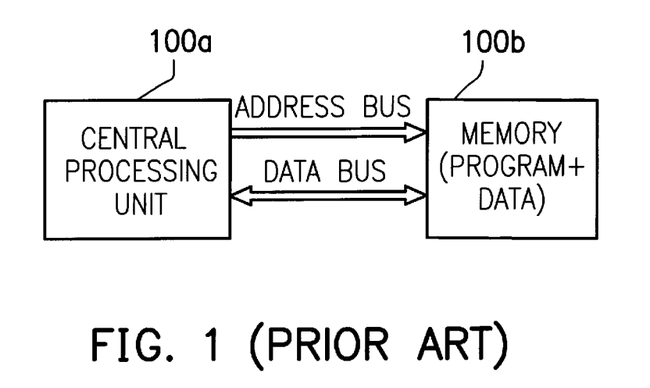
FIG. 1 is a block diagram of a Von Neumann architecture.
Figure 2:
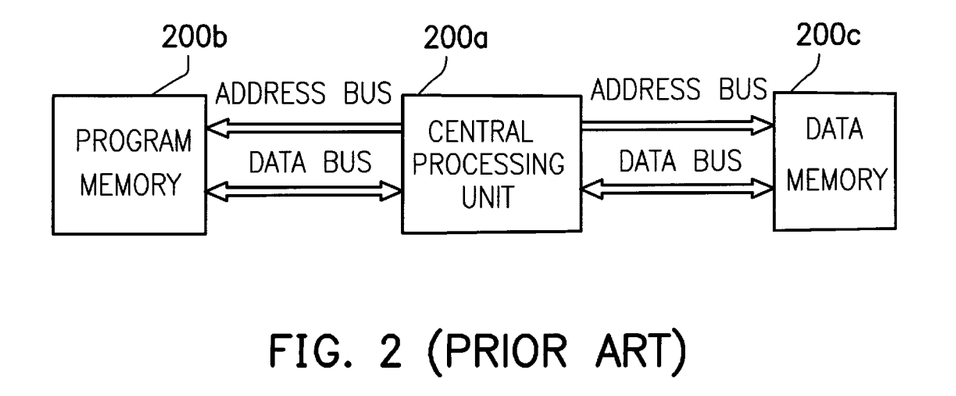
FIG. 2 is a block diagram of a Harvard architecture.

In general, architectural design for the central processing unit (CPU) can be classified into two main types, namely, a Von Neumann architecture or a Harvard architecture. FIG. 1 shows a block diagram of the Von Neumann architecture and FIG. 2 shows a block diagram of the Harvard architecture. Referring to FIG. 1, in the Von Neumann architecture the central processing unit 100a puts both the program and data into the same memory 100b. Referring to FIG. 2, in the Harvard architecture the central processing unit 200a puts the program and data into two separate memories 200b and 200c, respectively. This permits central processing unit 200a to access the program and the data in parallel and enhance system efficiency.

Figure 3:
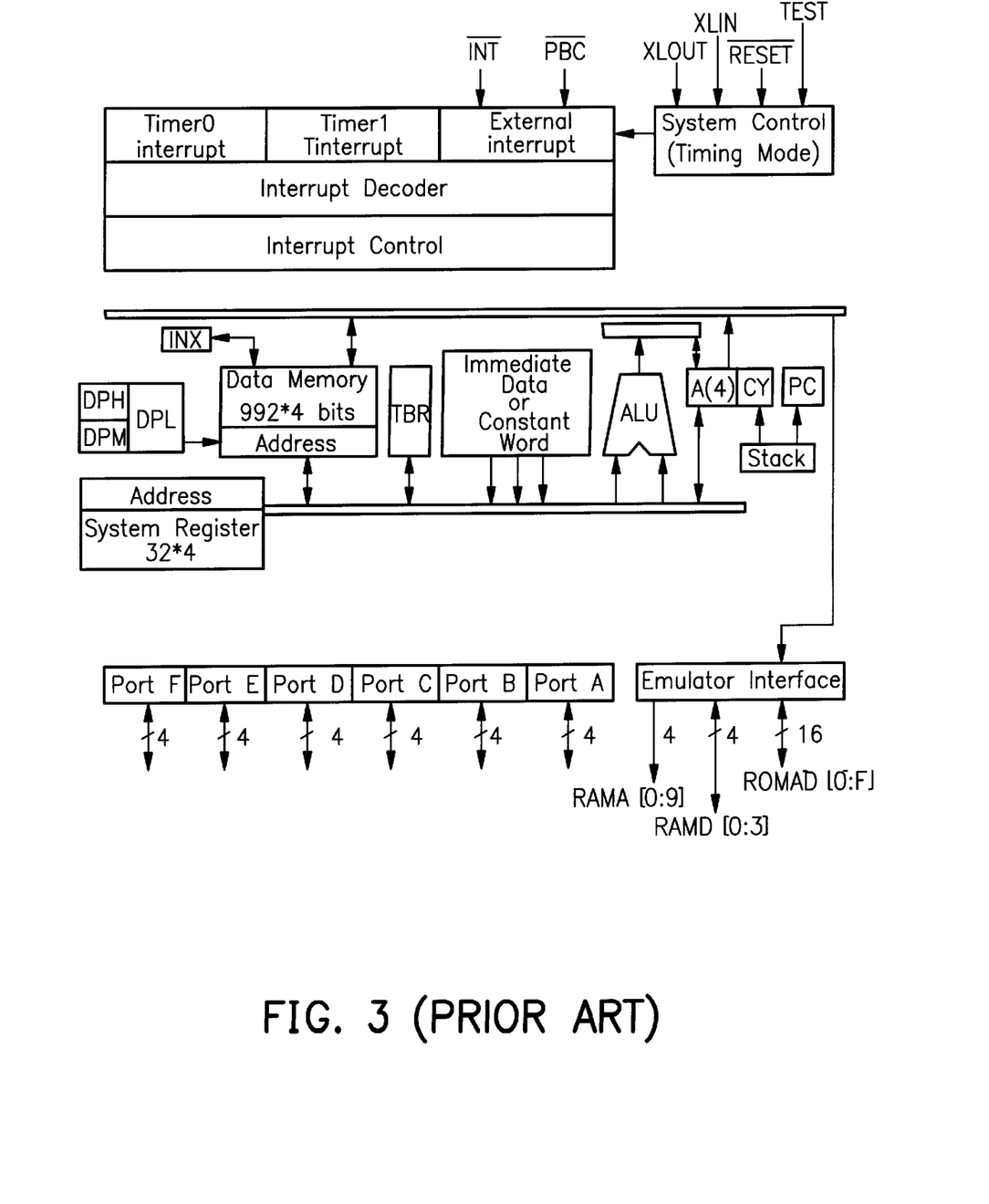
FIG. 3 is a block diagram of a UM6610 microprocessor system.

FIG. 3 shows a block diagram of the microprocessor system UM6610 fabricated by United Microelectronics Corporation (UMC). The UM6610 is a 4-bit Harvard type CPU having an independent program bus ROMAD[0:F] and two data buses RAMA[0:9] and RAMD[0:3], respectively. The program bus is 16-bit and the data buses are 4-bit each. Program bus ROMAD [0:F] is address bus and data bus in time-sharing scheme.

Because a CPU having a Von Neumann architecture does not differentiate between memory usage such as program or data, whenever a large amount of supplementary data such as speech data is needed, all necessary is to divide up a memory space into separate areas using different RAM or ROM as demanded. For example, the memory locations for the program and speech data are planned beforehand and stored in a mask ROM. However, because a CPU having a Harvard architecture requires separating mask ROMs to store speech data and programs, it causes more expensive to make the integrated circuit (IC). Each ROM unit must necessarily have an independent decoder, and also can not share the same sense amplifier. Furthermore, each ROM unit requires a respective test, it causes a built-in testing procedure more complex. Moreover, for a low cost microprocessor such as a UM6610, the memory space of its data RAM is small, and is not suitable for applications requiring the mass storage of data such as speech data.

For example, a speech IC such as a UM5220 comprising an UM6610 microprocessor has the program and speech data installed in separate mask ROMs. As mentioned above, this will increase the manufacturing cost and make the testing procedures more complex. However, if the program ROM is replaced with the speech ROM, the problem of memory under-utilization will be serious for a microprocessor employing a UM6610 type of architecture.

Figure 4:
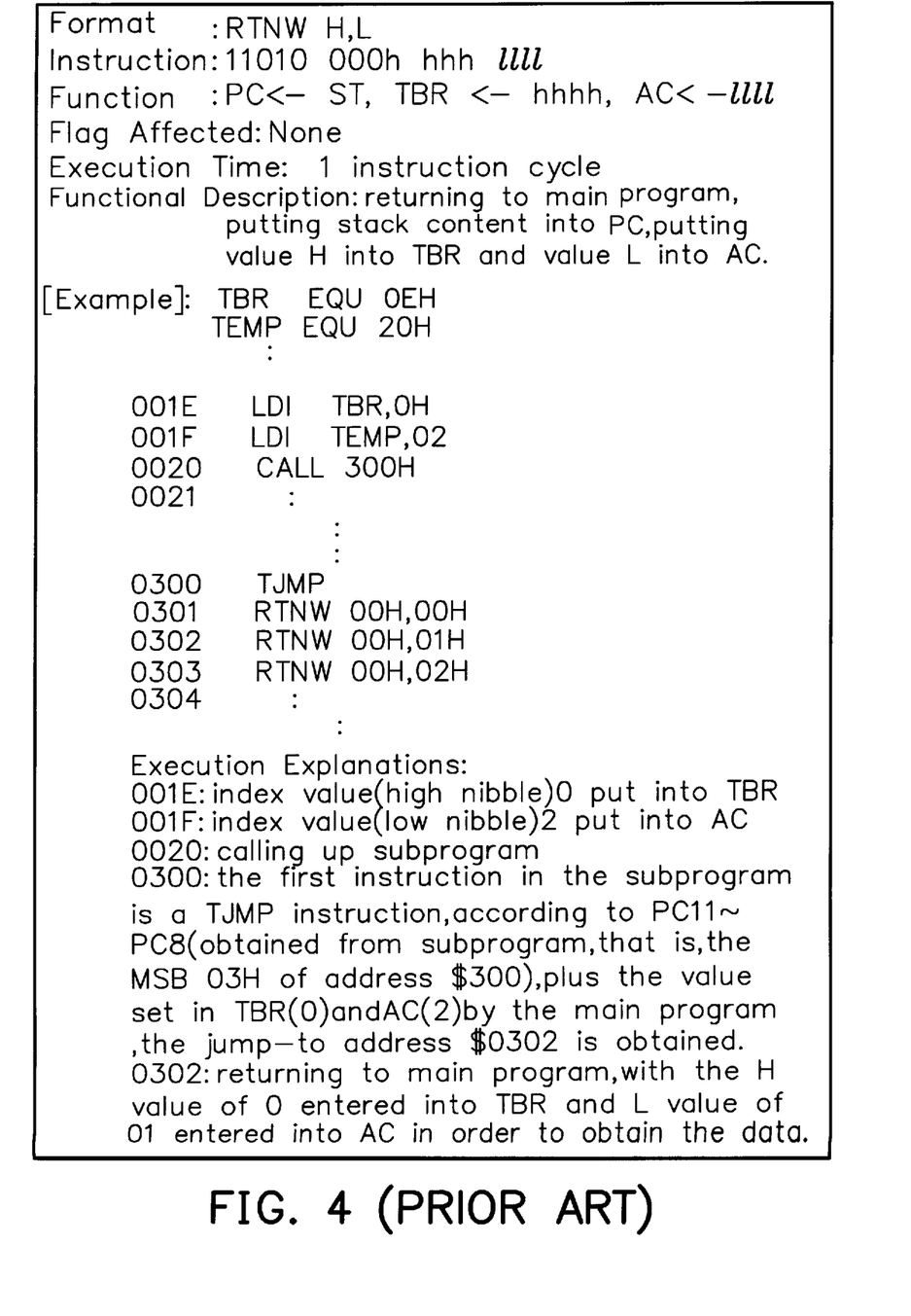
FIG. 4 is a description of a RTNW instruction.
Figure 5:
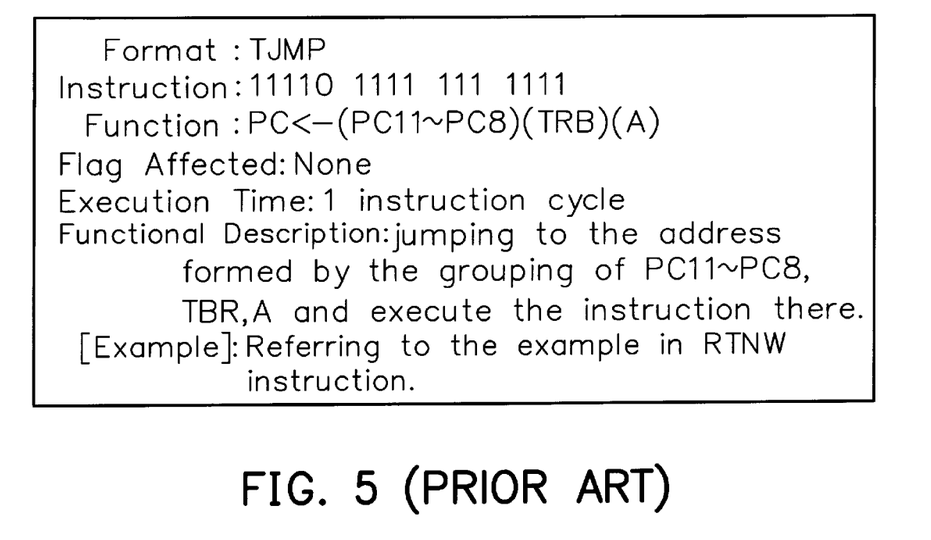
FIG. 5 is a description of a TJMP instruction.
Figure 6:
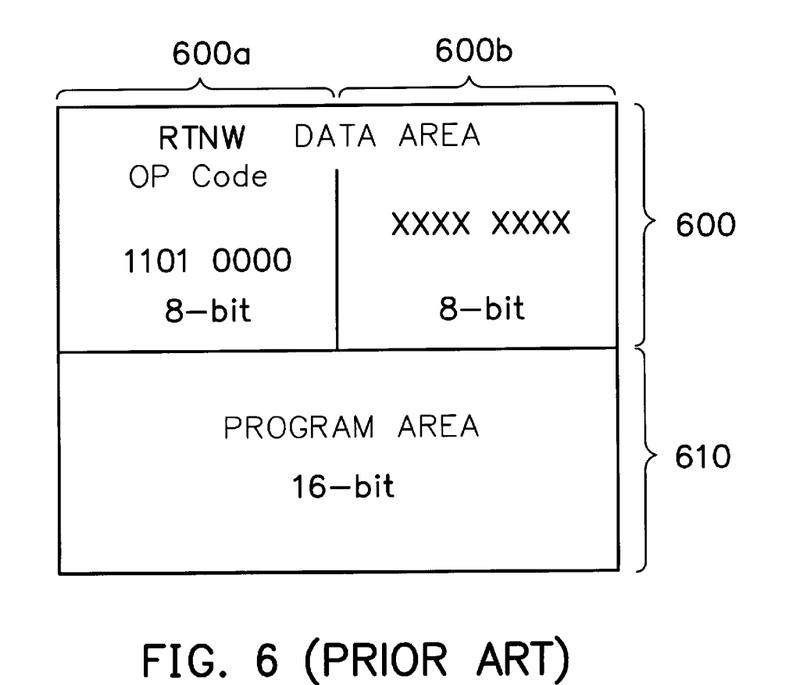
FIG. 6 shows the memory waste generated by using RTNW instruction in a speech data application.

FIG. 4 shows the operation of a RTNW (i.e., return word) instruction, FIG. 5 shows the operation of a TJMP (i.e., table jump) instruction and FIG. 6 shows how memory is wasted when a RTNW instruction is executed for retrieving speech data. Referring to FIGS. 4–6, the use of a RTNW instruction to retrieve an 8-bit data from the program ROM for a UM6610 microprocessor is actually having a memory utilization rate of 50%, because an instruction occupies 16 bits. As shown in FIG. 6, when the method according to the RTNW instruction is used, the high byte 600a in the data area 600 is the repeated RTNW op code, and only the low byte 600b in the data area 600 is the useful 8-bit data. This kind of arrangement implies memory wastage and is unacceptable for applications requiring a lot of data (such as speech synthesis).

SUMMARY OF THE INVENTION

The object of this invention is improving memory utilization of a microprocessor having an architectural design similar to a UM6610, by including both data and program instructions in the same memory. This provides a 100% memory utilization without the need for either changing the microprocessor architecture or adding any instructions, only the addition of some simple external circuits are required to achieve the desired improvements.

To attain the objects and advantages, and in accordance with the purpose of the invention, as embodied and broadly described herein, a method for increasing memory utilization is provided, which is applicable for systems comprising of a memory and a central processing unit, and wherein, the central processing unit is coupled to the memory through an address bus, comprises the steps of defining a special address space, checking the address given by the address bus to confirm whether the address is in the special address space or not, and sending the processed data to the central processing unit after retrieving from the memory if the address given by the address bus is in the special address space.

In accordance with another aspect of the present invention, a method for increasing memory utilization that is applicable to systems having of a UM6610 type microprocessor coupled to a memory through an address bus comprises the steps of defining a special address space in the memory address space using an option register so as to establish a memory area for the special treatment of RTNW instructions, checking the address given by the address bus to confirm whether the address is in the special address space or not before data is retrieved from the memory, and sending back to UM6610 microprocessor for execution a RTNW program code, which is a combination of the retrieved data from the memory and the internally generated RTNW op code, if the address given by the address bus is in the special address space.

In accordance with yet another aspect of the present invention, a device for increasing memory utilization that is applicable to systems having a microprocessor coupled to a memory through an address bus comprises an address detecting device coupled to the address bus for detecting whether the address given by the address bus is in a pre-defined address space, and a logic circuit coupled to the address detecting device, the memory and the microprocessor respectively, wherein if the address from the address bus detected by the address detecting device is in the special address space, then the correct piece of data retrieved from the memory will be combined with an internally generated op code to form a composite instruction and subsequently delivered back to the microprocessor.

In accordance with still another aspect of the present invention, a device for increasing memory utilization that is applicable to systems comprising a microprocessor and a memory comprises an address detecting device for detecting whether the memory address, where the required data is stored and need to be retrieved for the microprocessor, is in a pre-defined special address space or not, and a logic circuit controlled by the address detecting device for the selective outputing of data retrieved from the memory to the microprocessor.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION

Figure 7:
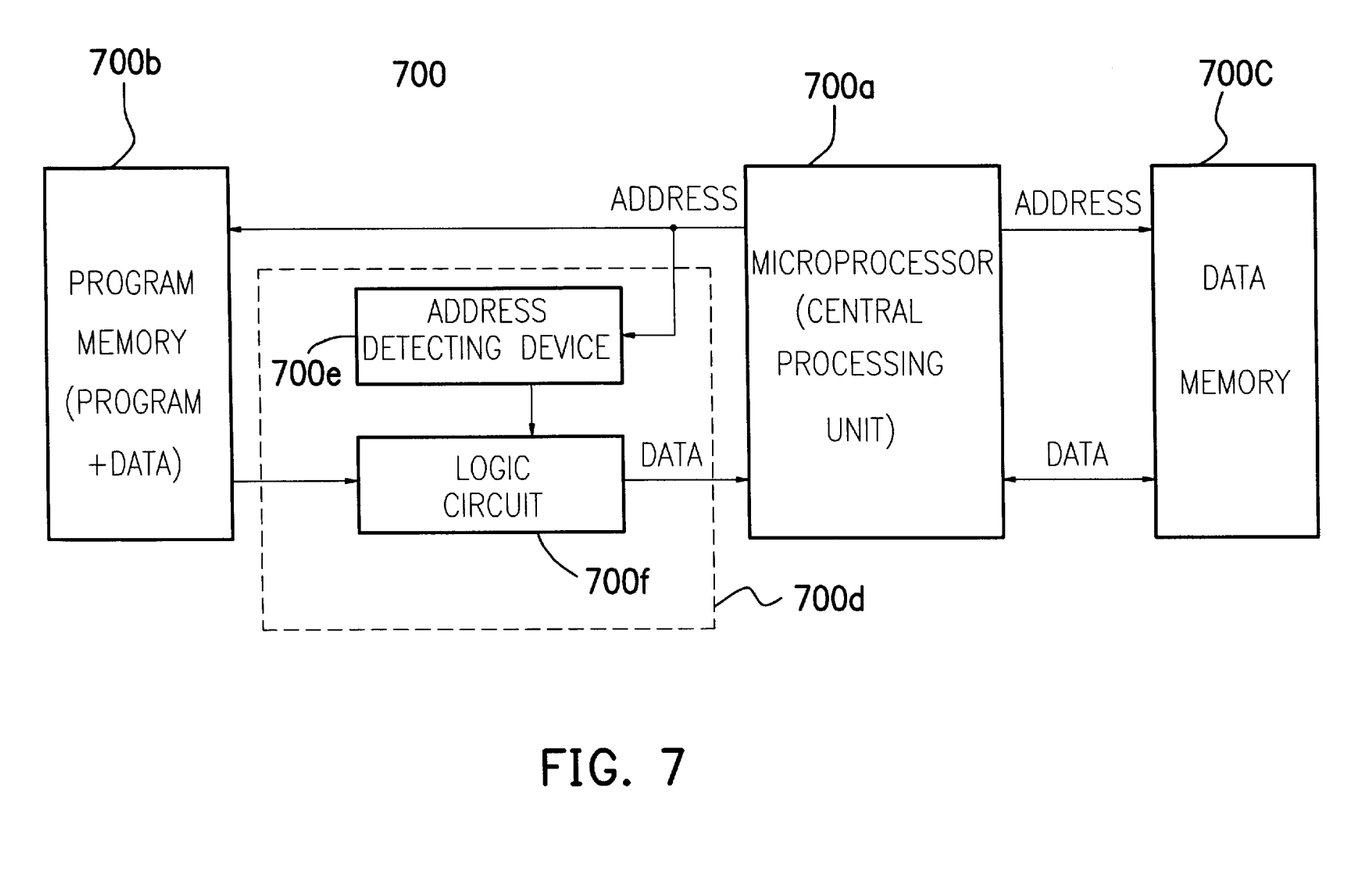
FIG. 7 is a block diagram showing a memory consist of central processing unit system consist of the present invention.

FIG. 7 is a block diagram showing a central processing unit system 700 consisted of the present invention. The main difference between system 700 and the system of FIG. 2 is the addition of an external circuit 700d linking central processing unit 700a and the program memory 700b. Circuit 700d includes an address detecting device 700e and a logic circuit 700f The main benefit of the invention is the innovative use of the program memory 700b to store both the programs and the data. For example, speech data is stored in the program ROM 700b. This increases memory utilization that would have been wasted with internal instructions. Aside from increasing memory utilization, no hardware changes are necessary for the microprocessor (or central processing unit) 700a, except for some minor changes in external circuits. Hence, the original central processing unit can be employed for producing prototypes. This in turn reduces the time required for program development.

Figure 8:
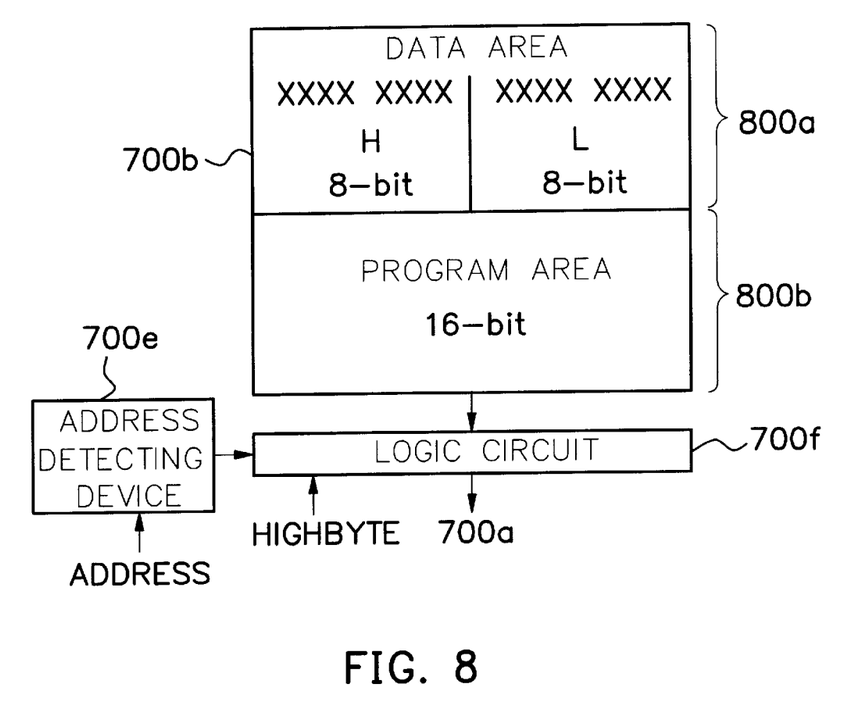
FIG. 8 is a block diagram of a memory device consisted of the invention.

FIG. 8 is a block diagram of a memory device 800. Referring to FIG. 8, the principle of the invention is to define a certain area in memory 700b as data area 800a, especially suited for the RTNW instruction, and the remaining area as general program area 800b. Before memory 700b is accessed, the memory address is first detected by an address detecting device 700e to determine whether the address is in the data area 800a or not. If the address is in data area 800a, the op code of the RTNW instruction is generated by logic circuit 700f and then combined with the data in data area 800a of memory 700b to form a complete RTNW instruction. Thereafter the complete RTNW instruction is transferred back to the microprocessor 700a for execution. If the address is outside data area 800a, an instruction code is passed directly from program area 800b of memory 700b.

Figure 9:
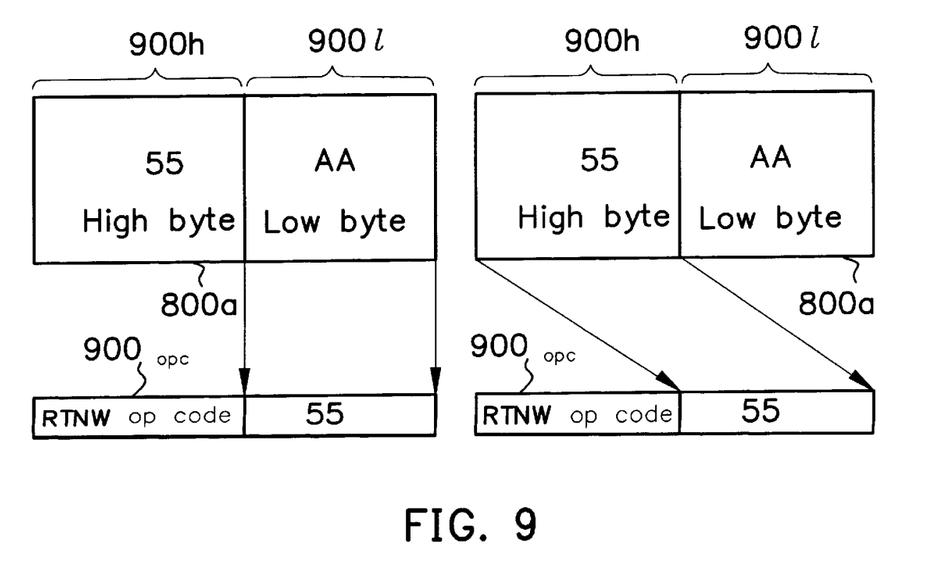
FIG. 9 is a block diagram showing the method for generating instructions consisted of the present invention.

Next, referring simultaneously to FIG. 8 and FIG. 9, where FIG. 9 is a block diagram showing the method for generating an instruction according to a data area format according to the invention. When the microprocessor 700a accesses data area 800a of memory 700b, the relevant 8 bits of data is retrieved from the data area through the logic circuit 700f according to control signals obtained from the address detecting device 700e and the HIGHBYTE respectively. For example, data residing in the high byte area 900h or in the low byte area 900l can be combined with the internally generated RTNW op code $900_{poc}$ to form a RTNW instruction. As shown in FIG. 9, either the RTNW op code $900_{opc}$ is combined with the low byte data AA to form a RTNW instruction, or the RTNW op code $900_{opc}$ is combined with the high byte data 55 to form another RTNW instruction. The above method of sending emulated instructions to microprocessor 700a increases the memory utilization rate to 100%.

Figure 10:
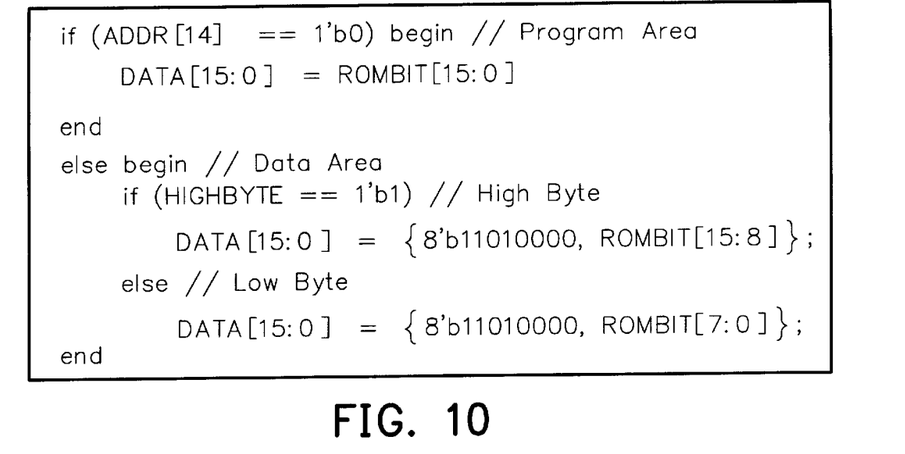
FIG. 10 is a piece of Verilog hardware description language (HDL) code used in the invention according to the first preferred embodiment.
Figure 11:
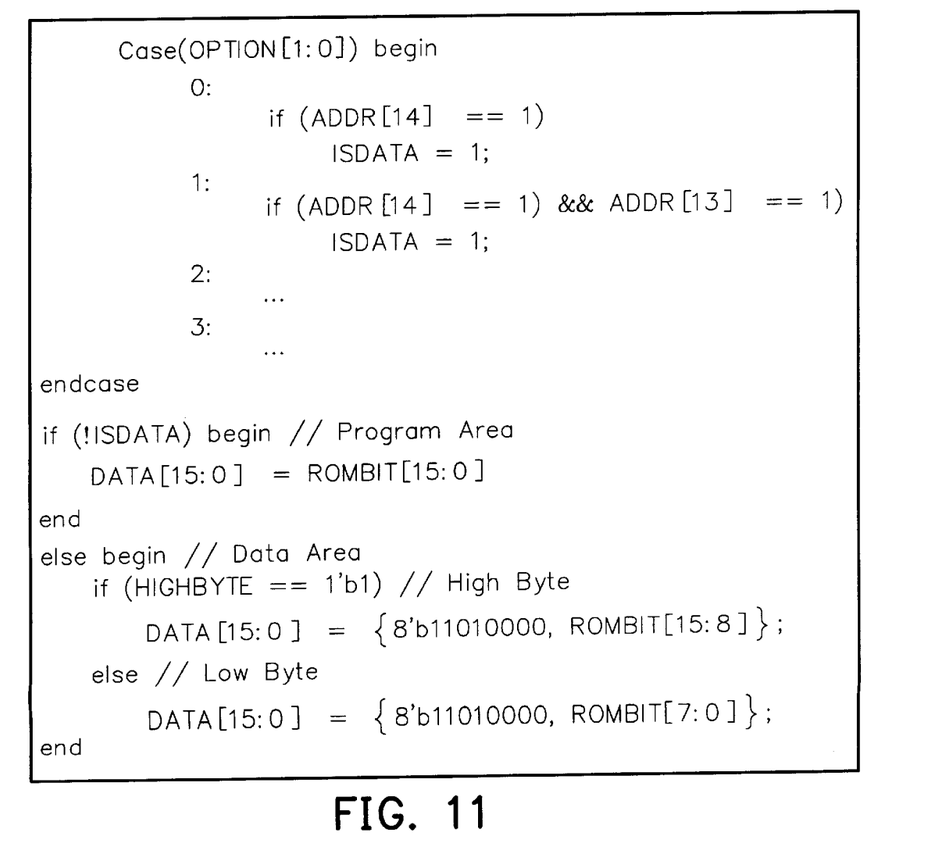
FIG. 11 is another piece of Verilog HDL code used in the invention according to a the second preferred embodiment.

Next, referring to FIG. 10 and FIG. 11, in FIG. 10 is a first preferred embodiment of this invention, which use a piece of Verilog hardware description language (HDL) code. FIG. 11 shows a second preferred embodiment using Verilog HDL code. When the HDL shown in FIG. 10 and FIG. 11 are properly synthesized with an appropriate cell library, a concrete workable circuit can be obtained. However, owing to varieties that can be practically implemented, only the main idea is therefore described in details. For example, in FIG. 10, selection of the program area or the data area is accomplished by choosing an address bit, while in FIG. 11, the selection is done by an option register. As a result, the program area/data area ratio for the memory can be tailored to the particular needs. For example, a memory of 16K can be divided into a data segment of 8 K and a program segment of 8K, or else the memory can be divided up into two segments with one having 12K and the other 4K. In the former case, only 1 bit is required for the selection of area, however, in the later case, 2 bits are required for the selection. Therefore, it is preferable to use an option register in hardware design because it is convenient to select the desired memory size in applications such as speech data.

Figure 12:
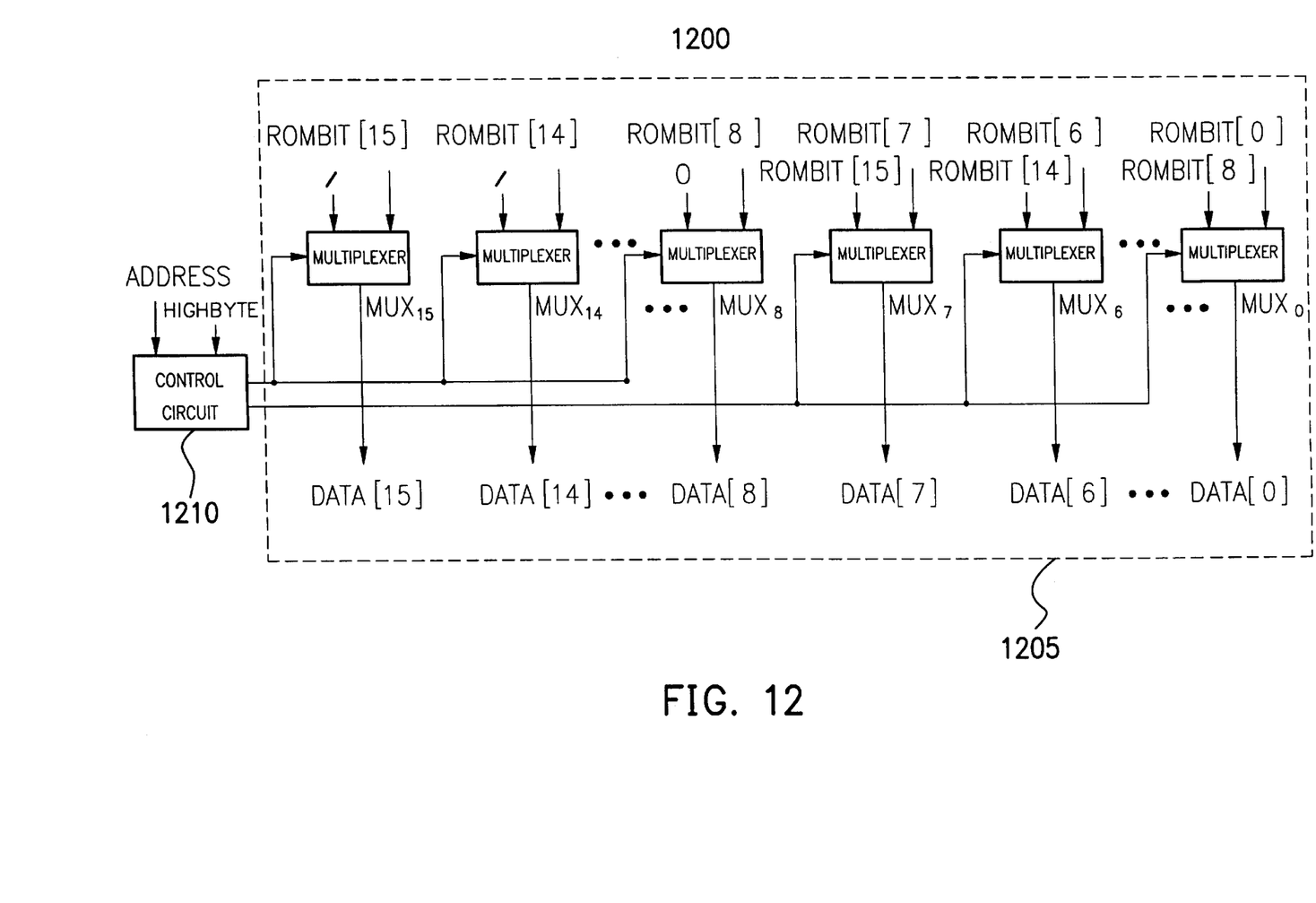
FIG. 12 is a block diagram of an external circuit used to implement the code in FIG. 10 or FIG. 11 according to the present invention.

FIG. 12 is a block diagram showing an external circuit 1200 consisted of the present invention. Circuit 1200 also shows an example of a hardware implementation for the codes in FIG. 10 or FIG. 11. Referring to FIG. 12, the assembly of multiplexers MUX 15~MUX 0 1205 is an example of logic circuit 700f, and control circuit 1210 is an example of the address detecting device 700e. Multiplexers MUX 15~0 1205 are coupled to the memory 700b of FIG. 7 by a bus ROMBIT[15]~[0], and are in turn coupled to the microprocessor 700a of FIG. 7 by a data bus DATA[15]~[0]. Inputs of the multiplexers MUX 15~8 are sequentially coupled to logic signals "1," "1," "0," "1," "0," "0," "0," "0" respectively because the op code of the RTNW instruction is represented by "11010000." The other inputs of the multiplexers MUX 15~8 are sequentially coupled to bus ROMBIT[15]~[8], respectively. Inputs of the multiplexers MUX 7~0 are sequentially coupled to bus ROMBIT[15]~[8], respectively. The other inputs of the multiplexers MUX 7~0 are sequentially coupled to bus ROMBIT[7]~[0], respectively. Therefore, there are altogether three kinds of connections to the data bus DATA[15]~[0], namely:

(a) DATA[15]~[0]=ROMBIT[15]~[0], data in program area of the memory is sent to the microprocessor;

(b) DATA[15]~[0]=[11010000], ROMBIT[15]~[8], RTNW op code is combined with the high byte in the data area of the memory and sent to the microprocessor; and (c) DATA[15]~[0]=[11010000], ROMBIT[7]~[0], RTNW op code is combined with the low byte in the data area of the memory and sent to the microprocessor.

In the last two cases, that is (b) & (c), the selection of high byte data or low byte data can be accomplished through the use of a control signal HIGHBYTE.

From the aforementioned description of the preferred embodiment, the method and device provided by the invention is capable of putting speech data into the program ROM and can increase the memory utilization. Furthermore, beside increasing memory utilization, no change is necessary in the hardware of the CPU except for some minor changes to the external circuits, so the original CPU can be immediately used in the prototype of this product, therefore a faster program development time is obtained.

While the invention has been described by way of a RTNW instruction example and in terms of the preferred embodiment, it is to be understood that the invention is not limited to the disclosed embodiment, other types of instructions or memory with more than two special instruction areas can also be used. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for conserving memory in systems characterized by having a memory coupled to a central processing unit by an address bus, the method comprising the steps of:

defining a special address space for data in the memory;

receiving an address from the address bus;

determining whether the address is in the special address space;

preprocessing data from the address in the special address space by combining a part of the data from the address in the special address space with a hardware simulated op code to form a composite instruction; and sending the preprocessed data to the central processing unit.

2. A method according to claim 1, wherein the defining step includes the substep of:

setting an option register to define the special address space.

3. A method for conserving memory in systems characterized by having a memory coupled to a microprocessor by an address bus, the method comprising the steps of:

defining a special address space in an address space of the memory;

receiving an address from the address bus;

determining whether the address is in the special address space;

retrieving data from the memory in accordance with the determination; and sending an instruction to the microprocessor, the instruction including the retrieved data and an op code if the address is in the special address space.

4. A method according to claim 3, further including the step of:

sending the retrieved data to the microprocessor if the address is not in the special address space.

5. A method according to claim 3, wherein the determining step include the substep of:

using an address detection device to determine whether the address from the address bus is in the special address space or not.

6. A method according to claim 3, wherein the sending step includes the substep of:

using a logic circuit to combine the retrieved data with the op code to form the program code.

7. A method according to claim 6, wherein the high byte of the retrieved data is combined with the op code to form the instruction.

8. A method according to claim 6, wherein the low byte of the retrieved data is combined with the op code to form the instruction.

9. A method according to claim 3, wherein the defining step includes the substep of;

using an option register to define the special address space.

10. A device for increasing memory utilization in systems characterized by having a memory coupled to a central processing unit by an address bus, the device comprising:

an address detector coupled to the address bus for detecting whether an address from the address bus is in a pre-defined address space of the memory; and a logic circuit coupled to the address detector, the memory, and the microprocessor, wherein when the address from the address bus as detected by the address detector is in the special address space, the logic circuit generates a instruction, including an op code combined with data retrieved from the memory at the address in the special address space, and provides the instruction to the microprocessor.

11. A device according to claim 10, wherein data retrieved from the memory is directly sent to the microprocessor when the address is not in the special address space.

12. A device according to claim 10, further comprising:

an option register for determining the special address space.

13. A device for conserving memory in systems characterized by having a memory coupled to a microprocessor by an address bus, the device comprising:

an address detecting device for detecting whether a memory address where data requested by the microprocessor is stored is in a pre-defined special address space; and a logic circuit controlled by the address detecting device for the selective providing the requested data to the microprocessor, wherein when the memory address detected by the address detecting device is in the special address space, the requested data is retrieved and combined by the logic circuit with an op code to form a composite instruction that is provided to the microprocessor, and when the memory address detected by the address detecting device is not in the special address space, the requested data is retrieved and provided directly to the microprocessor.

14. A device according to claim 13, wherein a controlling signal is used to determine whether a high byte or a low byte of the retrieved data is to be combined with the op code to form the composite instruction.

15. A device according to claim 13, wherein the device further includes an option register for defining the special address space.

16. A memory conserving device, comprising:

a UM6610 microprocessor;

a ROM;

an address detecting device for detecting whether a given ROM memory address provided by the UM6610 microprocessor for retrieving data from the ROM is within a pre-defined special address space; and a logic circuit controlled by the address detecting device for retrieving the data stored in the given ROM address and selectively providing the retrieved data to the UM6610 microprocessor;

wherein when the given ROM memory address falls within the special address space, the address detecting device signals the logic circuit to retrieve either a high byte or a low byte of the data to be combined with an internally generated RTNW op code to form a composite RTNW instruction.

17. A system for improving memory utilization, essentially comprising:

an UM6610 microprocessor;

a ROM;

an option register for defining a special address space;

an address detecting device for determining whether a given ROM memory address provided by the UM6610 microprocessor for retrieving data falls within the special address space; and a logic circuit for retrieving a piece of data from the ROM and combining the piece of data with a hardware generated RTNW op code to form a RTNW instruction according to a signal from the address detecting device and the determination that the given ROM address is within the special address space.

18. A method for increasing memory utilization in systems having a UM6610 microprocessor coupled to a memory by an address bus, the method comprising the steps of:

defining a special address space in the memory to establish a memory area for the special treatment of RTNW instructions;

checking an address from the address bus to determine whether the address is in the special address space or not; and providing the UM6610 microprocessor a RTNW program code, which is a combination of the retrieved data from the memory and a generated RTNW op code, according to a control signal generated when the address is in the special address space.

* * * * *